US008812166B2

(12) United States Patent
Wang et al.

(10) Patent No.: US 8,812,166 B2
(45) Date of Patent: Aug. 19, 2014

(54) SUPPLYING A RESOURCE TO AN ENTITY FROM A RESOURCE ACTUATOR

(75) Inventors: Zhikui Wang, Fremont, CA (US); Cullen E. Bash, Los Gatos, CA (US); Niraj Tolia, Mountain View, CA (US); Manish Marwah, Mountain View, CA (US); Parthasarathy Ranganathan, Fremont, CA (US); Shailesh N Joshi, Houston, TX (US); Andrew James Phelan, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 12/581,990

(22) Filed: Oct. 20, 2009

(65) Prior Publication Data

US 2011/0093128 A1 Apr. 21, 2011

(51) Int. Cl.
*G05B 13/04* (2006.01)
*G06F 1/28* (2006.01)
*G06F 17/11* (2006.01)
*G06F 9/50* (2006.01)

(52) U.S. Cl.
CPC ............ *G06F 9/5011* (2013.01); *G06F 9/5094* (2013.01); *G05B 13/04* (2013.01)
USPC ................. 700/295; 700/30; 700/33; 700/45; 700/276; 700/278; 703/2; 713/320; 713/321

(58) Field of Classification Search
USPC ........ 700/95, 33, 30, 276–278, 44–45; 703/2; 713/320, 321
See application file for complete search history.

(56) References Cited

U.S. PATENT DOCUMENTS

| 5,130,920 | A | * | 7/1992 | Gebo | 700/31 |
|---|---|---|---|---|---|
| 5,301,101 | A | * | 4/1994 | MacArthur et al. | 700/36 |
| 5,396,416 | A | * | 3/1995 | Berkowitz et al. | 700/45 |
| 6,494,047 | B2 | * | 12/2002 | Yeung | 60/782 |
| 6,501,998 | B1 | * | 12/2002 | Pfeiffer | 700/37 |
| 6,721,672 | B2 | * | 4/2004 | Spitaels et al. | 702/62 |
| 6,728,178 | B2 | * | 4/2004 | Koishi et al. | 369/47.53 |
| 6,856,888 | B2 | * | 2/2005 | Kawai | 701/103 |
| 6,961,628 | B2 | * | 11/2005 | Yutkowitz | 700/37 |
| 7,162,169 | B1 | * | 1/2007 | Lestrange | 399/46 |
| 7,206,644 | B2 | * | 4/2007 | Iino et al. | 700/36 |
| 7,232,506 | B2 | * | 6/2007 | George et al. | 204/192.13 |

(Continued)

OTHER PUBLICATIONS

Rolia et al, "A capacity Management service for Resource Pools", 2005, pp. 1-15.*

(Continued)

*Primary Examiner* — Ryan Jarrett
*Assistant Examiner* — Olvin Lopez Alvarez

(57) ABSTRACT

In a method for supplying a resource to an entity from a resource actuator, a plurality of physics-based models pertaining to the resource actuator and the entity are developed, a condition detected at the entity is received, feedback control on a resource demand of the entity is employed based upon the detected condition, feed forward control on the resource demand of the entity is employed based upon the detected condition and the plurality of physics-based models, a constraint optimization problem having an objective function and at least one constraint using the plurality of physics-based models is formulated, a solution to the constraint optimization problem is determined, in which the solution provides the actuator setting, and the resource actuator is set to the actuator setting to supply the entity with the resource from the resource actuator.

19 Claims, 7 Drawing Sheets

(56) References Cited

U.S. PATENT DOCUMENTS

| | | | |
|---|---|---|---|
| 7,272,732 B2* | 9/2007 | Farkas et al. | 713/320 |
| 7,583,043 B2* | 9/2009 | Chung et al. | 318/634 |
| 7,596,431 B1* | 9/2009 | Forman et al. | 700/299 |
| 7,668,703 B1* | 2/2010 | Rolia et al. | 703/2 |
| 7,861,102 B1* | 12/2010 | Ranganathan et al. | 713/300 |
| 7,885,795 B2* | 2/2011 | Rasmussen et al. | 703/5 |
| 8,108,697 B2* | 1/2012 | Ho et al. | 713/300 |
| 8,140,195 B2* | 3/2012 | Matteson et al. | 700/299 |
| 8,159,160 B2* | 4/2012 | Dishman et al. | 318/268 |
| 8,265,104 B2* | 9/2012 | Helms et al. | 370/535 |
| 8,392,003 B2* | 3/2013 | Wiener | 700/78 |
| 2003/0042860 A1* | 3/2003 | Sulfstede | 318/432 |
| 2005/0055590 A1* | 3/2005 | Farkas et al. | 713/320 |
| 2005/0192680 A1* | 9/2005 | Cascia et al. | 700/29 |
| 2006/0168975 A1* | 8/2006 | Malone et al. | 62/180 |
| 2007/0055402 A1* | 3/2007 | Guez et al. | 700/104 |
| 2008/0313492 A1* | 12/2008 | Hansen | 714/5 |
| 2009/0005912 A1* | 1/2009 | Srivastava et al. | 700/276 |
| 2009/0254769 A1* | 10/2009 | Brundridge et al. | 713/320 |
| 2009/0265568 A1* | 10/2009 | Jackson | 713/320 |
| 2010/0076607 A1* | 3/2010 | Ahmed et al. | 700/276 |
| 2010/0235011 A1* | 9/2010 | Tolia et al. | 700/295 |
| 2012/0005505 A1* | 1/2012 | Tolia et al. | 713/320 |
| 2012/0185711 A1* | 7/2012 | Parker et al. | 713/320 |

OTHER PUBLICATIONS

ABB, "PID Contrl theory made easy Optimising plant performance with modern process controllers", Jul. 2011, pp. 20.*

* cited by examiner

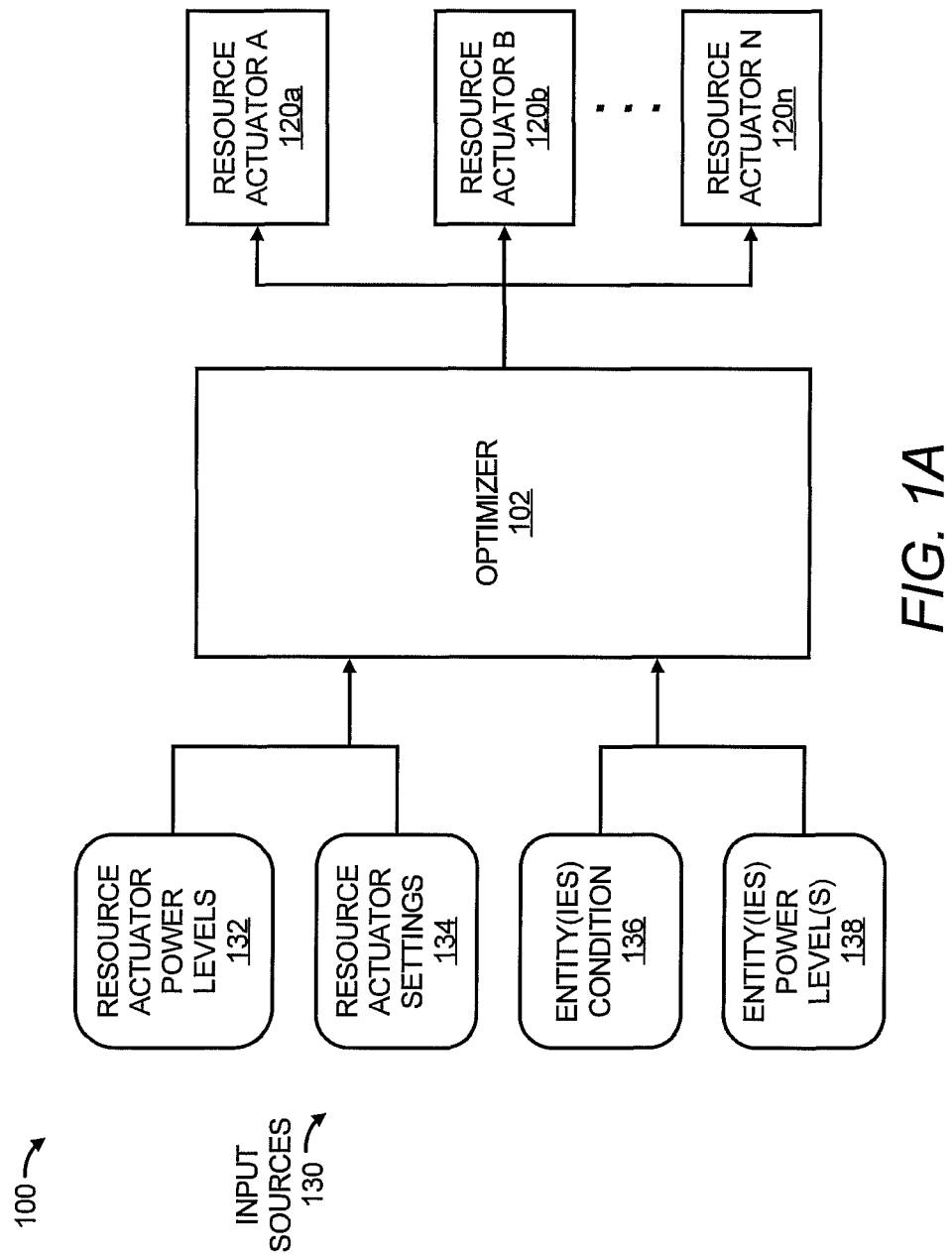

SUPPLYING A RESOURCE TO AN ENTITY FROM A RESOURCE ACTUATOR

CROSS-REFERENCE TO RELATED DISCLOSURES

The present application shares some common subject matter with copending and commonly assigned U.S. patent application Ser. No. 12/404,019, filed on Mar. 13, 2009, and entitled "Determining Optimal Settings for Resource Actuators" and PCT Application Serial No. PCT/US09/37177, filed on Mar. 13, 2009, and entitled "Determining Status Assignments That Optimize Entity Utilization and Resource Power Consumption", the disclosures of which are hereby incorporated by reference in their entireties.

BACKGROUND

Power is a critical issue in the design and operation of enterprise servers and data centers and is expected to continue to increase in importance due to the ever increasing demands of servers and data centers. Power consumed by cooling equipment (for instance, fans and computer room air conditioners) has also become a significant component in the design and operation of the enterprise servers and data centers. By way of example, the yearly electricity costs for the cooling equipment alone in a large data center (for instance, 30,000 square feet, rated at 10 MW) has been known to run in the millions of dollars.

The same trends in increased power consumption levels are also becoming more applicable at smaller scales, for instance, at the cluster level, or even at an individual server level. More particularly, with increasingly dense compute infrastructures and more powerful processors, the server fans are known to consume increasingly large amounts of power. For instance, the peak power usage by fans of certain blade servers has been found to be as high as 200 W, which comprises about 23% of the typical system power of the blade server.

BRIEF DESCRIPTION OF THE DRAWINGS

Features of the present invention will become apparent to those skilled in the art from the following description with reference to the figures, in which:

FIG. 1A shows a simplified block diagram of a system for supplying a resource to an entity from a resource actuator, according to an embodiment of the invention;

DETAILED DESCRIPTION

Figure 1B:
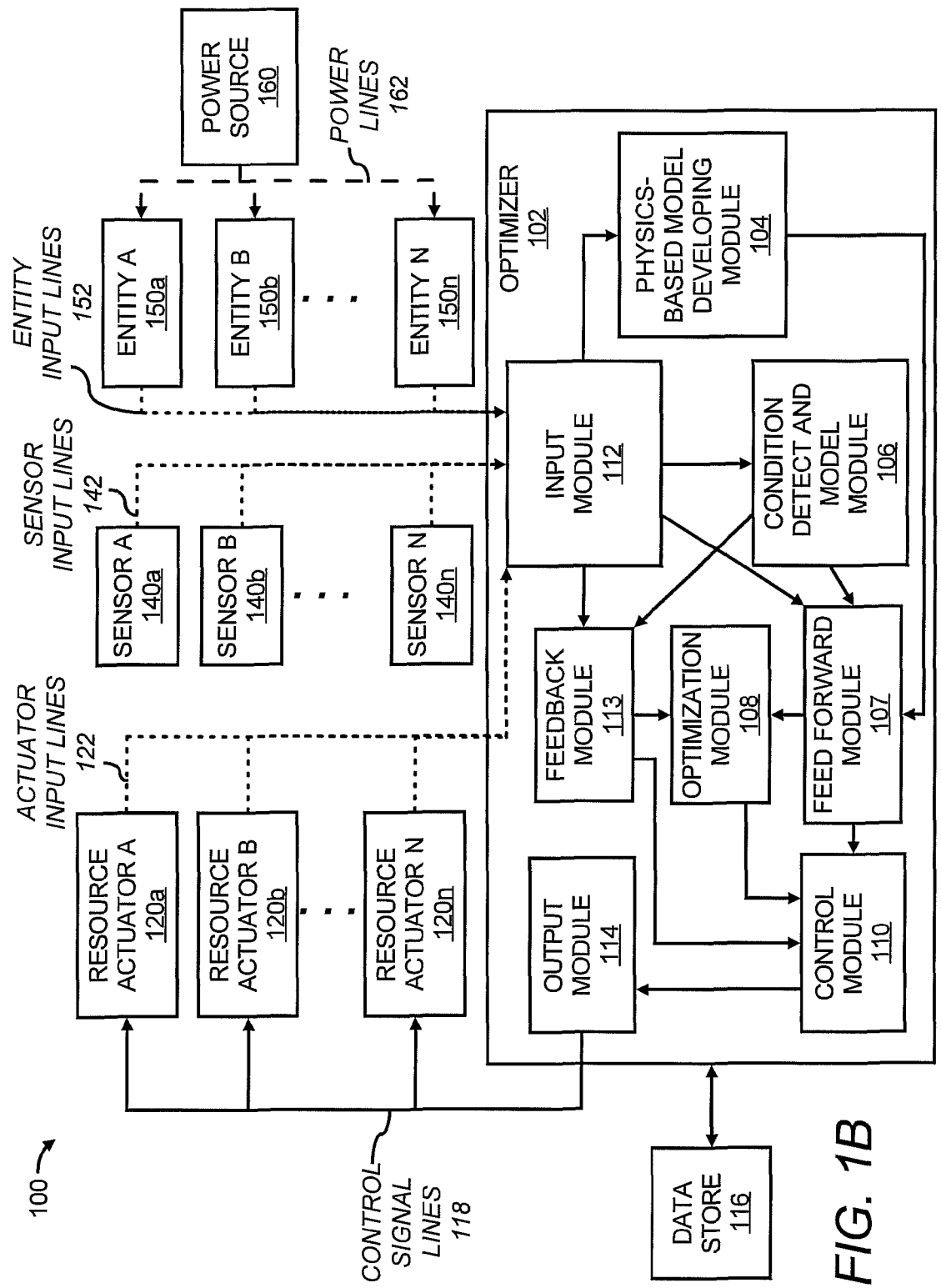
FIG. 1B shows a more detailed block diagram of the system depicted in FIG. 1A, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention. The articles "a" and "an" are used herein to denote "at least one" unless the context otherwise dictates.

Disclosed herein are a system and method for supplying a resource, such as, cooling airflow, or other fluid to one or more entities from a resource actuator that minimizes energy consumption of the resource while meeting the minimum threshold resource demand of the one or more entities. The settings for the resource actuator are determined through the construction of a plurality of physics-based models pertaining to the resource actuator and the entities and by solving a constraint optimization problem that has an objective function and one or more constraints. In the constraint optimization problem, the power consumption levels of the resource actuators are the objective function and the resource demands of the entities are the constraints. The solution to the constraint optimization problem provides the optimal values for the resource actuator settings.

Moreover, the resource demands of the entities may be modified based upon information pertaining to conditions detected at the entities in one or more manners. In one manner, the resource demand threshold may be minimized based on one or more of the physics-based models and detected conditions in a predictive manner as the workload or environment changes. In another manner, the resource demand threshold may be modified based upon an error between condition thresholds of the entities and the measured conditions.

The settings for the resource actuators are considered to be optimized when the resource actuators are able to be operated at minimized total power consumption level while satisfying one or more condition setpoint requirements at the one or more entities. By way of particular example, the resource actuators comprise fans and the entities comprise blade servers. In this example, the system and method disclosed herein determine the minimal speeds (optimal settings) at which the fans may be operated while supplying sufficient (condition setpoint requirement) levels of cooling to the blade servers. The entities may also comprise combinations of systems, such as, multiple blade servers or components of systems, such as, processors, hard drives, network cards, power supplies, etc.

Through implementation of the system and method disclosed herein, the amount of power consumed by the resource actuators in providing resources, such as, cooling resources, to the entities is minimized. This minimized power consumption translates into savings in both operating cost and, in certain instances, $CO_2$ emissions, while minimizing the impact on the operations of the entities. In addition, because the optimal resource actuator settings are determined through a model-based approach based on physics, which may be modified based upon detected conditions, the models may evolve with the system, thereby resulting in a highly robust control system.

With reference first to FIG. 1A, there is shown a simplified schematic diagram of a system 100 for supplying a resource to one or more entities from one or more resource actuators, according to an example. It should be understood that the system 100 may include additional elements and that some of the elements described herein may be removed and/or modified without departing from the scope of the system 100.

As shown, the system 100 includes an optimizer 102, which may comprise software, firmware, and/or hardware and is configured to determine optimal settings for a plurality of resource actuators 120a-120n. According to an example, the plurality of resource actuators 120a-120n is configured to affect one or more conditions at one or more entities. Thus, the plurality of resource actuators 120a-120n may be considered as providing shared resources, such as, cooling or other environmental condition resources, to the one or more entities, which may comprise any heat generating device, such as, electronic chips, servers, power supplies, networking equipment, storage devices, etc. The optimal settings for the resource actuators 120a-120n may be defined as those settings for the resource actuators 120a-120n that minimizes the total power consumption of the resource actuators 120a-120n while satisfying one or more predetermined conditions, such as a minimum threshold resource demand at each entity.

Although the resource actuators 120a-120n and the entities may comprise any number of different combinations of elements, the following examples are provided to afford a clearer understanding of potential relationships between resource actuators 120a-120n and entities. As a first particular example, the resource actuators 120a-120n comprise fans and the entities comprise servers, in which the fans and servers are positioned in an enclosure. As another particular example, the resource actuators 120a-120n comprise air conditioning units and the entities comprise servers housed in racks, in which the air conditioning units and the servers are housed in a room, such as a data center. As a further particular example, the resource actuators 120a-120n comprise firing actuators positioned in nozzles of a fluid jetting device and the entity comprises an electronic chip. As a yet further particular example, the resource actuators 120a-120n comprise pumps and the entities comprise air conditioning units, in which the pumps are positioned along various pipes configured to supply a cooling fluid to the air conditioning units.

As also shown in FIG. 1A, the optimizer 102 receives data from various input sources 130, which are described in greater detail herein below with respect to FIG. 1B. The data includes resource actuator power levels 132, resource actuator settings 134, conditions of one or more entities 136, and power levels of the one or more entities 138. The optimizer 102 is generally configured to implement the data received from the input sources 130 in determining the optimal settings for the plurality of resource actuators 120a-120n through use of physics-based models. More particularly, the optimizer 102 is configured to determine the settings for the plurality of resources actuators 120a-120n that minimize the power consumed by the resource actuators 120a-120n while maintaining at least a predefined level of resource provisioning to one or more entities.

Turning now to FIG. 1B, there is shown a more detailed schematic diagram of the system 100, according to an example. As shown in FIG. 1B, the optimizer 102 is depicted as including a physics-based model developing module 104, a condition detect and model module 106, a feed forward module 107, an optimization module 108, a control module 110, an input module 112, a feedback module 113, and an output module 114. The modules 104-114 are designed to perform various functions in the optimizer 102 using data obtained from the input sources 130.

In instances where the optimizer 102 comprises software, the optimizer 102 may be stored on a computer readable storage medium and may be executed or implemented by a computing device processor (not shown). In these instances, the modules 104-114 may comprise software modules or other programs or algorithms configured to perform the functions described herein below. In instances where the optimizer 102 comprises firmware and/or hardware, the optimizer 102 may comprise a circuit or other apparatus configured to perform the functions described herein below. In these instances, the modules 104-114 may comprise one or more of software modules and hardware modules configured to perform these functions.

In addition to the optimizer 102 and the resource actuators 120a-120n, the system 100 is depicted as including a plurality of sensors 140a-140n and a plurality of entities 150a-150n. The "n" denotes an integer value greater than or equal to one in each of the previously discussed reference numerals, and thus indicates that the system 100 may include one or more resource actuators 120a-120n, one or more sensors 140a-140n, and one or more entities 150a-150b.

Each of the resource actuators 120a-120n may generally be defined as any reasonably suitable device capable of varying the provisioning of a shared resource, such as, a cooling fluid, air, water, etc., to one or more of the entities 150a-150n. In addition, each of the resource actuators 120a-120n may have multiple settings, for instance, settings in addition to "on" and "off" to thus vary the supply of the fluid to multiple levels. Moreover, the resource actuators 120a-120n may comprise homogeneous or heterogeneous devices. As an example of heterogeneous devices, for instance, one of the resource actuators 120a may be configured to vary the supply of airflow whereas another one of the resource actuators 120b may be configured to vary the supply of a liquid coolant provided to one or more of the entities 150a-150n.

Likewise, each of the entities 150a-150n may be defined as any reasonably suitable device that is positioned to be affected by variations of the supply of the fluid by one or more of the resource actuators 120a-120n. In addition, the sensors 140a-140n are configured to sense one or more of the conditions, such as, temperature, fluid flow volume, fluid flow velocity, pressure, humidity, thermal resistance, etc., around the entities 150a-150n. The sensors 140a-140n may have a one-to-one correlation with the entities 150a-150n or there may be more or fewer sensors 140a-140n as compared with entities 150a-150n.

According to an example, each of the sensors 140a-140n may be associated with one or more of the entities 150a-150n and may thus be configured to detect one or more conditions of a resource supplied to respectively associated entities 150a-150n. Thus, for instance, a first sensor 140a is configured to detect a condition of a resource supplied to a first entity 150a, a second sensor 140b is configured to detect a condition of a resource supplied to a second entity 150b, etc. According to an example, the first sensor 140a may be positioned at a fluid inlet of a first entity 150a, the second sensor 140b may be positioned at a fluid inlet of a second entity 150b, etc. In another example, the first sensor 140a may be positioned within a first entity 150a, the second sensor 140b may be positioned within a second entity 150b, etc.

As further shown in FIG. 1B, the entities 150a-150n receive power from a power source 160 through respective power lines 162. Although not shown, the optimizer 102, the resource actuators 120a-120n, and the sensors 140a-140n also receive power from a power source, which may be the same or different from the power source 160. In any regard, the amount of power that the entities 150a-150n draw from the power source 160 may be tracked through any suitable known manner. For instance, each of the entities 150a-150n may be equipped with a power meter configured to measure the amount of power that each of the entities 150a-150n consumes. As another example, power meters may be positioned along the power lines 162, externally to the entities 150a-150n, to measure the power supplied into the entities 150a-150n. As a further example, the amount of power consumed by the entities 150a-150n may be calculated, for instance, based upon the levels at which the entities 150a-150n are operating. By way of particular example in which the entities 150a-150n comprise servers, the operating levels of the processors may be used to calculate the power consumption levels of the servers.

The input module 112 is configured to receive input from the resource actuators 120a-120n, sensors 140a-140n, and entities 150a-150n. The input module 112, more particularly, is configured to receive settings of the resource actuator 120a-120n via actuator input lines 122, conditions sensed by the sensors 140a-140n via sensor input lines 142, and the entity power levels 138 (shown in FIG. 1A) via entity input lines 152. The input module 112 may also be configured to receive resource actuator 120a-120n power consumption levels via the actuator input lines 122.

In other examples, the input module 112 is configured to receive input from devices configured to track one or more operating conditions of the resource actuators 120a-120n and/or the entities 150a-150n. These devices may include, for instance, devices positioned internally or externally to the resource actuators 120a-120n configured to track the settings of the resource actuators 120a-120n. By way of example, the devices may comprise encoders that detect the position of various components, such as, louvers, pump components, fan components, etc., configured to vary the flow of fluid through the resource actuators 120a-120n. As another example, these devices may comprise sensors positioned to detect a characteristic, such as, velocity, pressure, volume flow rate, etc., of fluid flow supplied through the resource actuators 120a-120n, which may be used to determine the resource actuator 120a-120n settings.

These devices may also include, for instance, devices positioned internally or externally to the entities 150a-150n, such as power meters, configured to measure the power consumption levels of the entities 150a-150n.

The data received through the input module 112 may be stored in a data store 116, which the optimizer 102 may access in performing various functions discussed below. The data store 116 may comprise volatile and/or non-volatile memory, such as DRAM, EEPROM, MRAM, flash memory, and the like. In addition, or alternatively, the data store 116 may comprise a device configured to read from and write to a removable media, such as, a floppy disk, a CD-ROM, a DVD-ROM, or other optical or magnetic media.

The physics-based model developing module 104 is configured to develop a plurality of physics-based models pertaining to the resource actuators 120a-120n and the entities 150a-150n. The physics-based model developing module 104 is configured to develop a power model for the resource actuators 120a-120n that relates settings of the resource actuators 120a-120n to power consumed by the resource actuators 120a-120n. The physics-based model developing module 104 is configured to develop the power model through application of a suitable algebraic form of the relationship between the power consumed by a resource actuators 120a-120n and its setting. An example of a suitable form is:

$$P_i = p_i(A_i). \quad \text{Equation (1)}$$

In Equation (1), $P_i$ is the power consumed by the ith resource actuator 120a-120n, $A_i$ is the setting of the ith resource actuator 120a-120n, and $p_i$ is an algebraic function relation $P_i$ to $A_i$. In addition, the total power consumption (P) of the plurality of resource actuators 120a-120n is defined as the sum of the power consumption levels of the resource actuators 120a-120n, or:

$$P = \Sigma P_i. \quad \text{Equation (2)}$$

The physics-based model developing module 104 is further configured to develop an actuator performance model of the resource actuators 120a-120n that relates settings of the resource actuators 120a-120n to resource capacities that the resource actuators 120a-120n are configured to supply. The physics-based model developing module 104 is configured to develop the actuator performance model through application of a suitable algebraic form of the relationship between the resource capacity that may be supplied by the resource actuators 120a-120n and settings of the resource actuators 120a-120n. An example of a suitable form is:

$$C_i = c_i(A_i). \quad \text{Equation (3)}$$

In Equation (3), $C_i$ is the capacity of the ith resource actuator 120a-120n, $A_i$ is the setting of the ith resource actuator 120a-120n, and $c_i$ is an algebraic function relation $C_i$ to $A_i$. An example of the capacity of the ith resource actuator 120a-120n is an air flow rate from cooling fans. In addition, the total resource capacity (C) of the plurality of resource actuators 120a-120n is defined as the sum of the capacity of the resource actuators 120a-120n, or:

$$C = \Sigma C_i. \quad \text{Equation (4)}$$

According to an example, the settings of the resource actuators 120a-120n may be expressed as vectors. In addition, the functions $p_i$ and $c_i$ may be determined by collecting experimental data pertaining to the resource actuator 120a-120n settings and their power consumption levels and by fitting the functions $p_i$ and $c_i$ to the experimental data.

The physics-based model developing module 104 is also configured to develop an entity performance model of the entities 150a-150n that relates an environmental condition in the entities 150a-150n to a resource, such as a resource provisioning by the resource actuators 120a-120n. The physics-based model developing module 104 is configured to develop the entity performance model through application of a suitable algebraic form of the relationship between the environmental condition in the entities 150a-150n and resources. For example, the entity performance model of the entity 150a relates the temperature in the entity 150a to a cooling supply to the entity 150a. An example of a suitable form is:

$$T_j = t_j(C_j, P_j, T_{amb,j}, t). \quad \text{Equation (5)}$$

In Equation (5), $T_j$ is the temperature of the jth entity, $C_j$ is a resource supply to the jth component, $P_j$ is a power generated by the jth entity, $T_{amb,j}$ is the ambient temperature around the jth entity, t is time, and $t_j$ is an algebraic function relating $T_j$ to ($C_j$, $P_j$, $T_{amb,j}$, t). Here, the time, t, may be continuous or discrete. According to an example, if entities being cooled are heterogeneous, the algebraic function $t_j$ may depend on a specific entity, such as blade servers, network switches, and storage arrays.

The physics-based model developing module 104 is further configured to develop a resource capacity sharing model that captures the relation between a set of capacities for the resource actuators 120a-120n and resources supplied to the entities 150a-150n. The physics-based model developing module 104 is configured to develop the resource capacity sharing model through application of a suitable algebraic form of the relationship between a set of capacities for the resource actuators 120a-120n and resources supplied to the entities 150a-150n. An example of a suitable form is:

$$C_j = s_j(C_i, i=1,2,\ldots,n).\qquad \text{Equation (6)}$$

In Equation (6), $C_j$ is a resource supply to the jth component, $C_i$ is the resource capacity of the ith resource actuator 120a-120n, and $s_j$ is an algebraic function relating $C_j$ to $C_i$. The algebraic function, $s_j$, defines how the resource capacity of the multiple resource actuators 120a-120n is shared by the individual entities 150a-150n.

The condition detect and model module 106 is configured to detect real time environmental condition in the entities 150a-150n and to develop a condition model that relates the settings of the plurality of resource actuators 120a-120n to an environmental condition at the location of at least one entity 150a-150n and a power consumption level of the at least one entity 150a-150n. The condition detect and model module 106 is configured to develop the condition model through application of a suitable algebraic form of the relationship between a plurality of the resource actuator 120a-120n settings, the detected environmental condition, the power consumed by the at least one entity 150a-150n, material properties of the at least one entity 150a-150n, such as, thermal resistance, etc. Although the form of the relationship may take many forms depending upon any number of various factors, an example of a suitable form is:

$$EC_i = g_i(A_1, \ldots, A_n, PE_i).\qquad \text{Equation (7)}$$

In Equation (7), $EC_i$ is the condition at the ith entity 150a-150n, $A_j$ is the setting of the jth resource actuator 120a-120n, $PE_i$ is the power consumed by the ith entity 150a-150n, and $g_i$ is an algebraic function relating the condition to the resource actuator settings and the power consumption level of the ith entity 150a-150n. In addition, the function $g_i$ may be determined by collecting experimental data pertaining to the resource actuator 120a-120n settings, the power consumption levels of the entities 150a-150n, and the detected conditions and by fitting the function $g_i$ to the data. It should be noted that when the entities 150a-150n comprise heterogeneous entities, such as, blade servers, network switches, storage arrays, etc., the function $g_i$ will depend upon the specific entity.

The feed forward module 107 is configured to determine the minimum threshold resource demands of the entities 150a-150n based upon the plurality of physics-based models, the reference environmental conditions on the entities 150a-150n and the measured environmental conditions of the entities 150a-150n. The feed forward module 107 may also be configured to modify the resource actuator 120a-120n settings based upon the plurality of physics-based models and the reference environmental conditions on the entities 150a-150n and the measured environmental conditions of the entities 150a-150n. The feedback module 113 is configured to modify the minimum threshold resource demands of the entities 150a-150n based upon a detected error between the reference environmental conditions on the entities 150a-150n and the measured environmental conditions of the entities 150a-150n. The feedback module 113 may also be configured to modify the resource actuator 120a-120n settings based upon a detected error between the reference environmental conditions on the entities 150a-150n and the measured environmental conditions of the entities 150a-150n.

The optimization module 108 is configured to formulate a constraint optimization problem having an objective function and one or more constraints, such as a minimum demand of each of the entities, using the plurality of physics-based models developed by the physics-based model developing module 104 and to solve the constraint optimization problem. Here, the solution of the constraint optimization problem provides the resource actuator 120a-120n settings. The objective function computes at least a proportional quantity of a total power consumption level of the plurality of resource actuators 120a-120n and the at least one constraint comprises a minimum demand of at least one entity 150a-150n. In order to construct the objective function, a relationship between a resource actuator 120a-120n setting and the power consumed by that resource actuator 120a-120n is necessary. The optimization module 108 is configured to employ the plurality of physics-based models, which captures this relationship based upon physics, to construct the objective function.

The optimization module 108 is further configured to employ one or more mathematical tools to solve the constraint optimization problem, the solution of which provides optimal settings for the plurality of resource actuators 120a-120n. These mathematical tools include, for instance, Lagrangian multipliers, dynamic programming, interior point methods, etc. The selection of which of the mathematical tools to employ may be based upon the nature of the objective function, for instance, whether it is linear, quadratic, cubic, etc. and the nature of the at least one constraint, for instance, whether it is linear or non-linear.

According to an example, the optimization module 108 stores the solution to the constraint optimization problem or the optimal settings for the plurality of resource actuators 120a-120n in the data store 116. According to another example, the optimization module 108 employs the output module 114 to output the solution or the optimal setting values to a computing device, a display screen, to a controller of the resource actuators 120a-120n, etc.

The optimizer 102 optionally includes a control module 110 configured to generate command signals for the resource actuators 120a-120n. In this example, the control module 110 is configured to generate command signals for each of the resource actuators 120a-120n to be set to the optimal settings determined by the optimization module 108. In addition, the control module 110 is configured to communicate the command signals to the resource actuators 120a-120n through the output module 114 over control signal lines 118. The control module 110 is considered to be optional because the functions of the control module 110 may be performed by a separate controller of the resource actuators 120a-120n using the optimized settings determined by the optimizer 102.

Figure 2A:
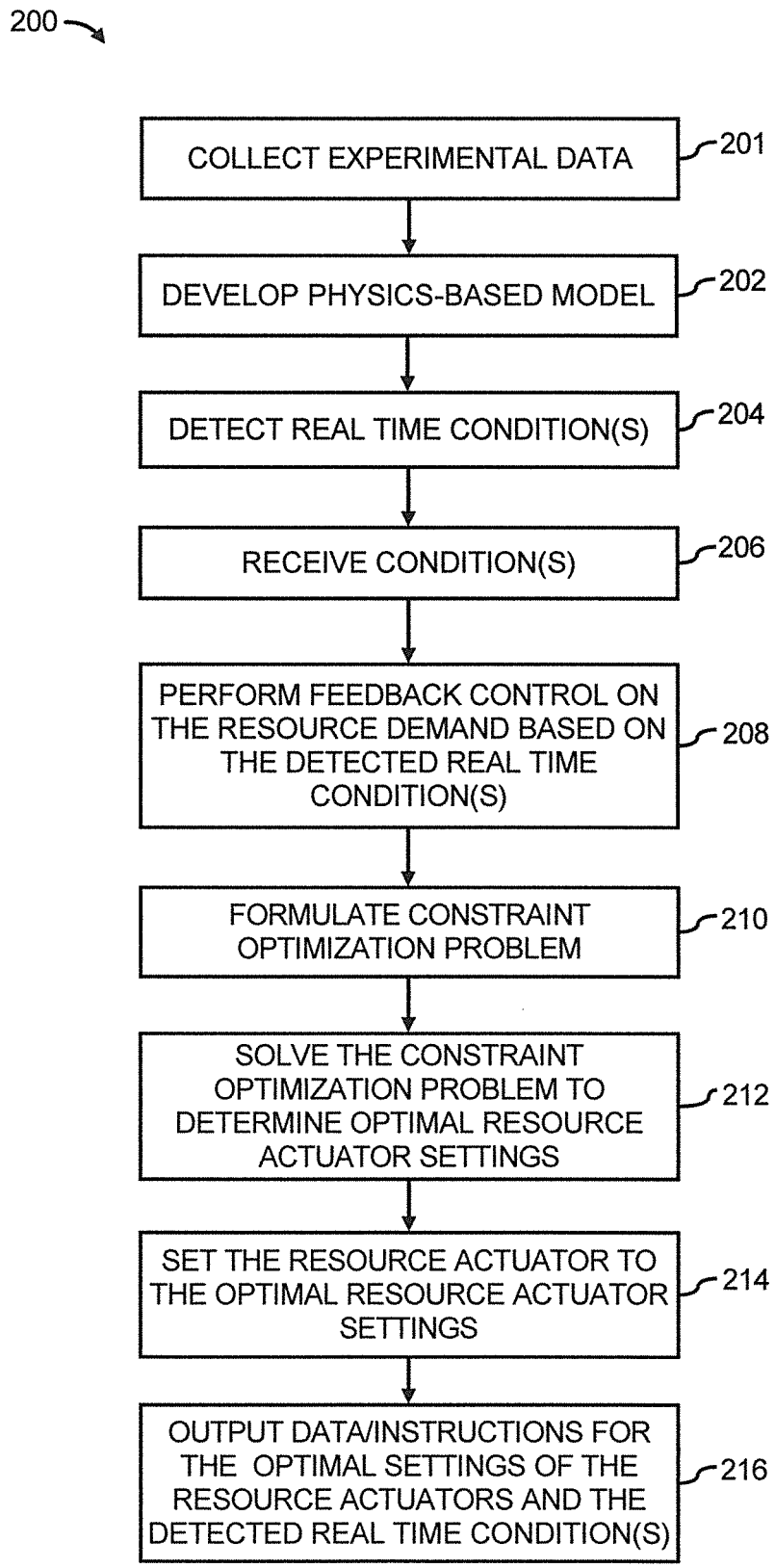
FIG. 2A illustrates a flow diagram of a method of supplying a resource to an entity from a resource actuator, according to an embodiment of the invention.

An example of a method in which the optimizer 102 may be employed to supply a resource to one or more entities 150a-150n from one or more resource actuators 120a-120n that minimizes energy consumption of the resource while meeting the minimum threshold resource demands of the one or more entities 150a-150n will now be described with respect to the following flow diagram of the methods 200 and 250 depicted in FIGS. 2A and 2B, according to an example. It should be apparent to those of ordinary skill in the art that the methods 200 and 250 represent generalized illustrations and that other steps may be added or existing steps may be removed, modified or rearranged without departing from the scopes of the methods 200 and 250.

The descriptions of the methods 200 and 250 are made with reference to the systems 100 illustrated in FIGS. 1A and 1B, and thus makes reference to the elements cited therein. It should, however, be understood that the methods 200 and 250 are not limited to the elements set forth in the systems 100. Instead, it should be understood that the methods 200 and 250 may be practiced by a system having a different configuration than that set forth in the systems 100.

A controller, such as a processor (not shown), may implement or execute the optimizer 102 to perform one or more of the steps described in the methods 200 and 250 in supplying a resource to at least one entity 150a-150n from at least one resource actuator 120a-120n. As discussed above, the settings for the plurality of resource actuators 120a-120n are considered to be optimized when the total power consumption associated with operating the resource actuators 120a-120n is minimized while one or more predetermined conditions, such as a minimum threshold resource demand at each entity 150a-150n are satisfied.

At step 202, a plurality of physics-based models pertaining to the resource actuators 120a-120n and the entities 150a-150n are developed. According to an example, and as discussed above, the physics-based model developing module 104 may develop the plurality of physics-based models through application of algebraic relationships on experimental data collected at step 201.

Figure 2B:
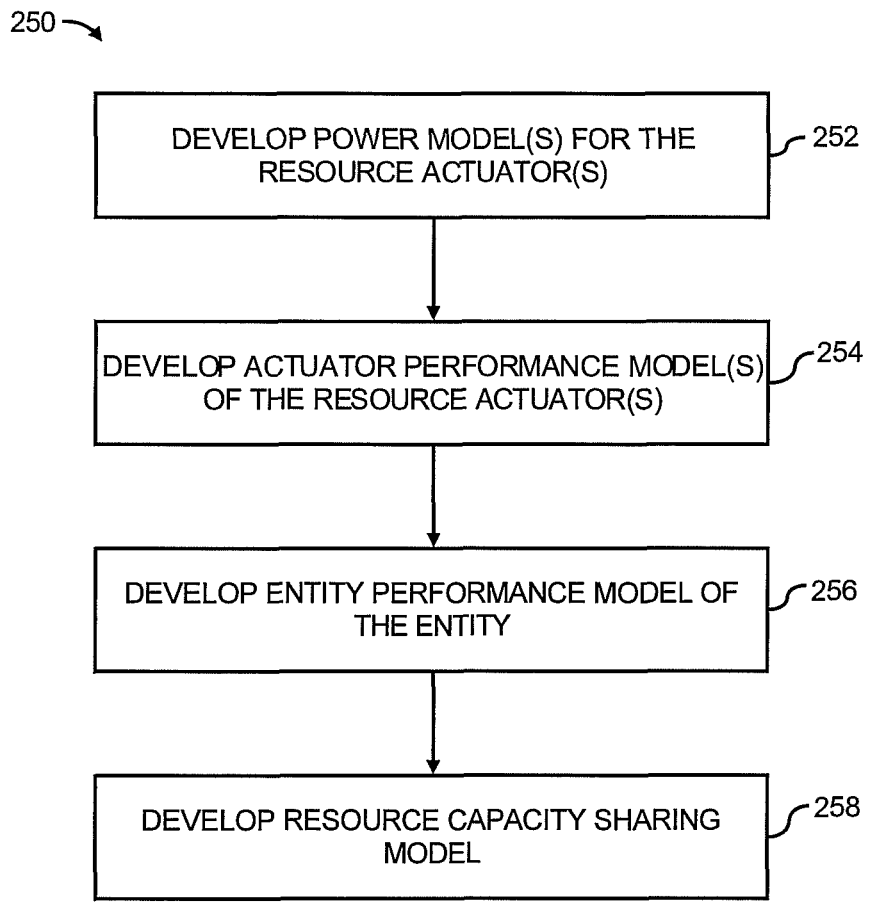
FIG. 2B illustrates a flow diagram of a method for developing a plurality of physics-based models, according to an embodiment of the invention.

With particular reference to FIG. 2B, there is shown a flow diagram of a method for developing the plurality of physics-based models, according to an example. As shown therein, at step 252, a power model for the resource actuator 120a-120n that relates settings of the resource actuator 120a-120n to power consumed by the resource actuator 120a-120n is developed. At step 254, an actuator performance model of the resource actuator 120a-120n that relates settings of the resource actuator 120a-120n to resource capacities that the resource actuator 120a-120n is configured to supply is developed. At step 256, an entity performance model of the entity 150a-150n that relates an environmental condition in the entity 150a-150n to resource provisioning by the resource actuator 120a-120n is developed. At step 258, a resource capacity sharing model that captures the relation between a set of capacities for the plurality of resource actuators 120a-120n and resources supplied to the plurality of entities 150a-150n is developed.

With reference back to FIG. 2A, at step 204, data pertaining to real time environmental conditions at the entities 150a-150n are detected. The environmental conditions may be detected by the sensors 140a-140n and communicated to the optimizer 102 through any recently suitable means.

At step 206, the optimizer 102 receives substantially real time environmental conditions detected at the entities 150a-150n. The conditions may include, for instance, one or more environmental conditions detected by the sensors 140a-140n, the power levels of the entities 150a-150n, etc. In addition, the conditions are considered to be received in substantially real time to thus capture relatively current conditions.

Figure 3A:
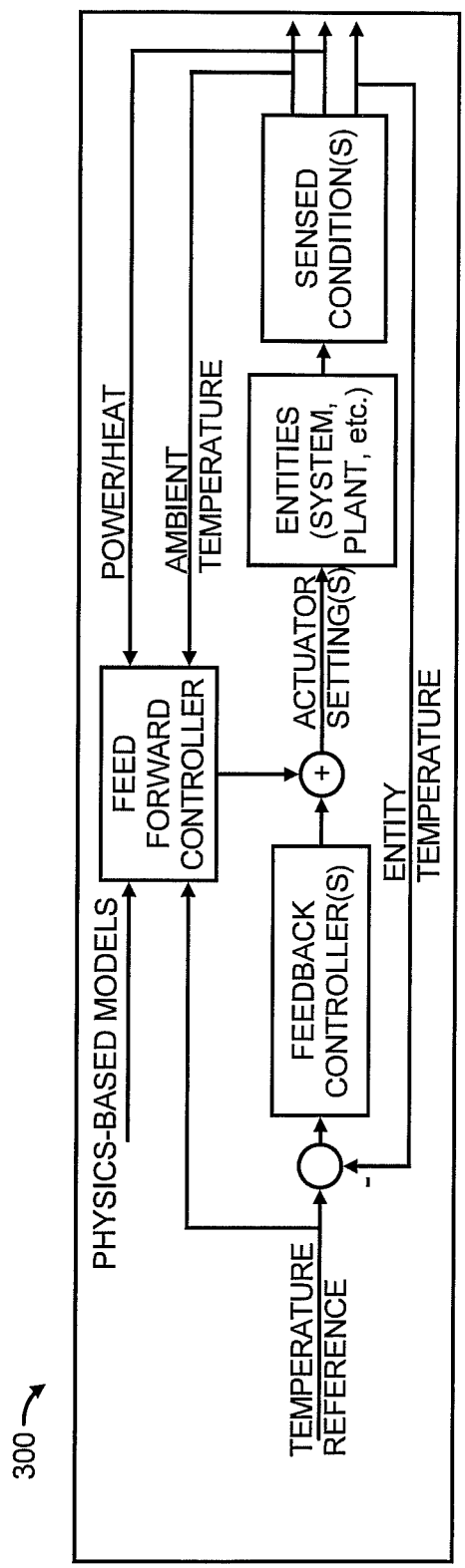
FIGS. 3A-3C depict respective block diagrams that show feedback and feed forward control architectures, according to three embodiments of the invention.
Figure 3B:
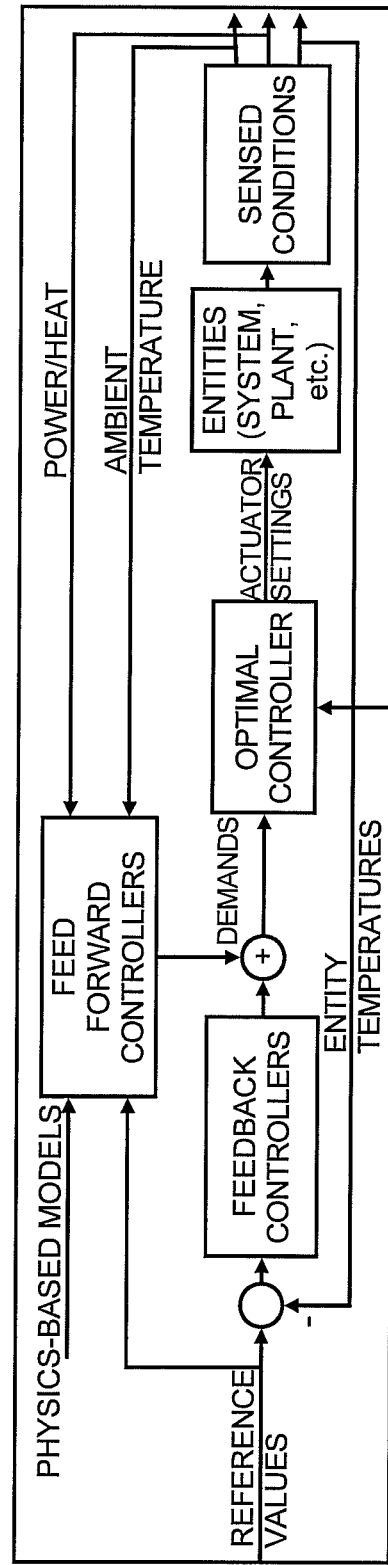
Figure 3C:
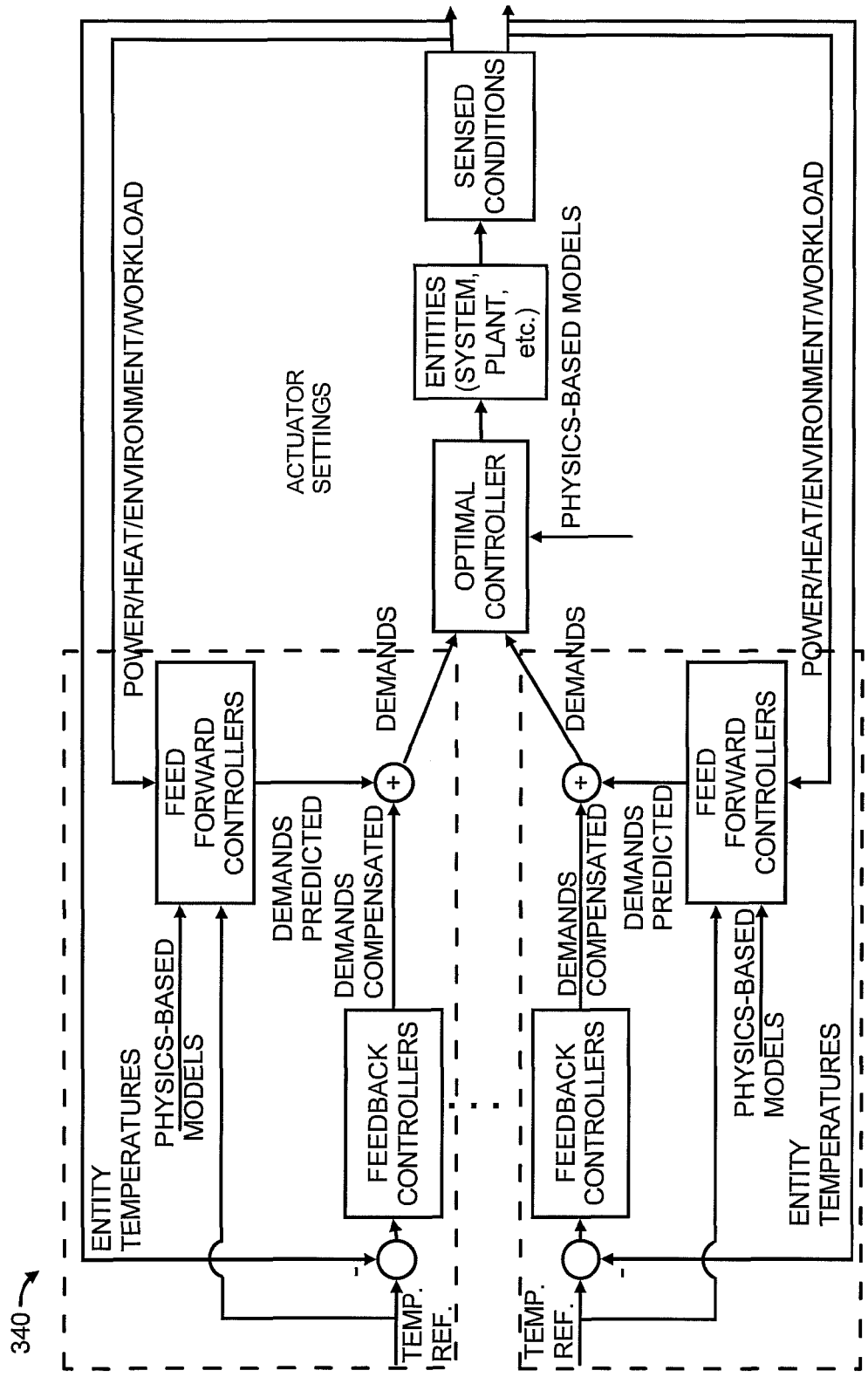

At step 208, feedback control on the resource demands of the entities 150a-150n is performed based upon the detected condition to control supply of the resource to the entities 150a-150n. More particularly, errors between the reference environmental conditions on the entities 150a-150n and the measured environmental conditions are employed to drive changes to the resource demands. For instance, the feedback controller is driven by the error between the temperature references and the measured conditions, and drives the error to zero by changing the resource demand of the entities 150a-150n. In addition, although not explicitly shown, feed forward control on the resource demand of the entities 150a-150n may also be performed at step 208. In this example, the feed forward module 107 may be configured to modify the resource demands based on one or more of the plurality of physics-based models developed at step 202 and the data pertaining to the real-time environmental conditions detected at the entities 150a-150n and their reference. According to an example, and as shown in FIG. 3A, the feedback controller and the feed forward controller uses the resource demands of the entities 150a-150n to determine the resource actuator settings. According to another example, and as shown in FIGS. 3B and 3C, an optimal controller determines the resource actuator settings from the resource demands of the entities 150a-150n.

At step 210, the optimization module 108 formulates a constraint optimization problem having an objective function and at least one constraint using the plurality of physics-based models. The objective function computes at least a proportional quantity of a total power consumption level of the plurality of resource actuators and the at least one constraint comprises a minimum demand of the at least one entity 150a-150n. Formulation of the constraint optimization problem may identify a minimum threshold resource demand of the entity 150a-150n to maintain a thermal performance requirement and may also identify a setting for the resource actuator 120a-120n that minimizes energy consumption of the resource while meeting the minimum threshold resource demand of the entity 150a-150n.

At step 212, the optimization module 108 solves the constraint optimization problem based upon the substantially real time conditions received at step 206, in which the solution provides optimal values for the resource actuator 120a-120n settings. The optimal values for the resource actuator 120a-120n settings are designed to minimize power consumption of the resource actuator while satisfying the threshold environmental condition at the location of the entity 150a-150n.

At step 214, the control module 110 sets the resource actuators 120a-120n to the optimal values for the resource actuator 120a-120n settings that are acquired by solving the constraint optimization problem at step 212.

According to an example, the settings of the resource actuators 120a-120n may be set over time or from interval to interval. At each interval, there are two steps to set up the actuator settings for the resource actuators 120a-120n. In the first step, the individual components determine the minimum resource demands, such as cooling demands to maintain their thermal performance requirement. In an example, when the model is described as $t_j$, the first step may be defined to solve one optimization problem. That is, find the minimum resource supply required at the jth component. An example of a suitable form is:

$$\min(C_j) \text{ for } T_j \leq T_{th}. \qquad \text{Equation (8)}$$

In Equation (8), $T_{th}$ is the temperature threshold. This problem may be solved using standard optimization or employing feedback control on the resource actuators 120a-120n based upon the detected condition to control supply of the resource to the entities 150a-150n as described herein. In an example, the method 200 may be implemented through proactive and reactive real-time control. For instance, upon changes of the entities 150a-150n, such as that of workload and environment temperature, the optimizer 102 may set the minimum resource demand level predicted based on the model $t_j$. Because the model $t_j$ may not be exactly correct, and the error of the model $t_j$ may result in over or under estimation on the minimum resource demand level, the feedback module 113 is employed to correct the error over the time. As discussed above, the feedback module 113 may be driven by the difference between the temperature reference and its measurement.

In the second step, the demands of the entities 150a-150n are collected, and the resource actuator 120a-120n settings are optimized for energy minimization. The problem can be formulated as one optimization problem. That is, to find the actuator settings $A_i$ for all the resource actuators such that:

$$\min \sum_i P_i \text{ for } C_j \geq C_j*. \quad \text{Equation (9)}$$

In Equation (9), $C_j*$ is the demand level predicted by the feedback controllers at the individual components. Standard optimization techniques can be applied to solve this problem together with model $c_j$ and other possible constraints.

Examples of manners in which the feed forward module 107 and the feedback module 113 may operate to control the resource actuator 120a setting are provided below with respect to FIGS. 3A-3C. FIGS. 3A-3C, more particularly, depict respective block diagrams 300, 320, and 340 that show feedback and feed forward loops in control architectures, according to three examples. It should be understood that the block diagrams 300, 320, and 340 may include additional elements and that some of the elements described herein may be removed and/or modified without departing from the scopes of the block diagrams 300, 320, and 340.

With reference first to FIG. 3A, physics-based models developed, for instance, as discussed above with respect to step 202, and a reference temperature setting and one or more conditions detected at the entities 150a-150n are received, as discussed above with respect to step 206. In addition, the models and the received information are inputted to the feed forward controller to determine the feed forward settings for the resource actuator(s) 120a-120n. As shown in FIG. 3A, the one or more conditions may include power/heat dissipated, ambient temperature, and entity temperature.

As further shown, one or more of the conditions may be used to modify the actuator settings directly based upon, for instance, an error between a condition threshold of the entities 150a-150n and the detected condition through the feedback controller.

According to an example, the feed forward controller(s), such as the feed forward module 113, and the feedback controller(s), such as the feedback module 107, operate at different timescales. For instance, the feedback operation may be performed substantially continuously and the feed forward operation may be performed at larger intervals of time, for instance, in tens of seconds, minutes, hourly etc.

With reference to FIG. 3B, the demands of the entities instead of the actuator settings are outputs from the feed forward and/or the feedback controllers. The operations may be performed by multi-input multi-output controllers configured to serve multiple entities such as servers, or components inside a server including but not limit to CPU, Memory DIMMs, PCI modules and multiple resource actuators 120a-120n. As shown in FIG. 3B, an optimal controller is configured to determine the settings for each of the resource actuators 120a-120n by minimizing a total power consumption for the resource actuators 120a-120n while satisfying the minimum demand from the individual entities 150a-150n that are outputs from the feedback and/or feed forward controllers.

With reference now to FIG. 3C, the block diagram 340 depicts a distributed architecture where multiple resource actuators 120a-120n are controlled based upon conditions detected at respective entities 150a-150n. More particularly, for each of the entities 150a-150n, there are feedback and/or feed-forward controllers and each of the feedback and feed forward controllers may have multiple inputs and multiple outputs. In addition, the optimal controller determines the settings for each of the resource actuators 120a-120n by minimizing a total power consumption for the resource actuators 120a-120n while satisfying the minimum demand from the individual entities 150a-150n that are outputs from the feedback and/or feed forward controllers.

Turning back to FIG. 2A, at step 216, the optimization module 108, the feedback controllers, and/or the feed forward controllers output data/instructions pertaining to the optimal values for the resource actuator 120a-120n settings. The data/instructions may be outputted to the data store 116, displayed on a display device, printed by a printing device, communicated to a networked computing device or storage location, etc. The instructions pertaining to the optimal values may be communicated to the resource actuators 120a-120n to cause the resource actuators 120a-120n to operate at the optimal settings.

Some or all of the operations set forth in the methods 200 and 250 may be contained as a utility, program, or subprogram, in any desired computer accessible medium. In addition, the methods 200 and 250 may be embodied by computer programs, which can exist in a variety of forms both active and inactive. For example, they may exist as software program(s) comprised of program instructions in source code, object code, executable code or other formats. Any of the above may be embodied on a computer readable medium, which include storage devices.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 4:
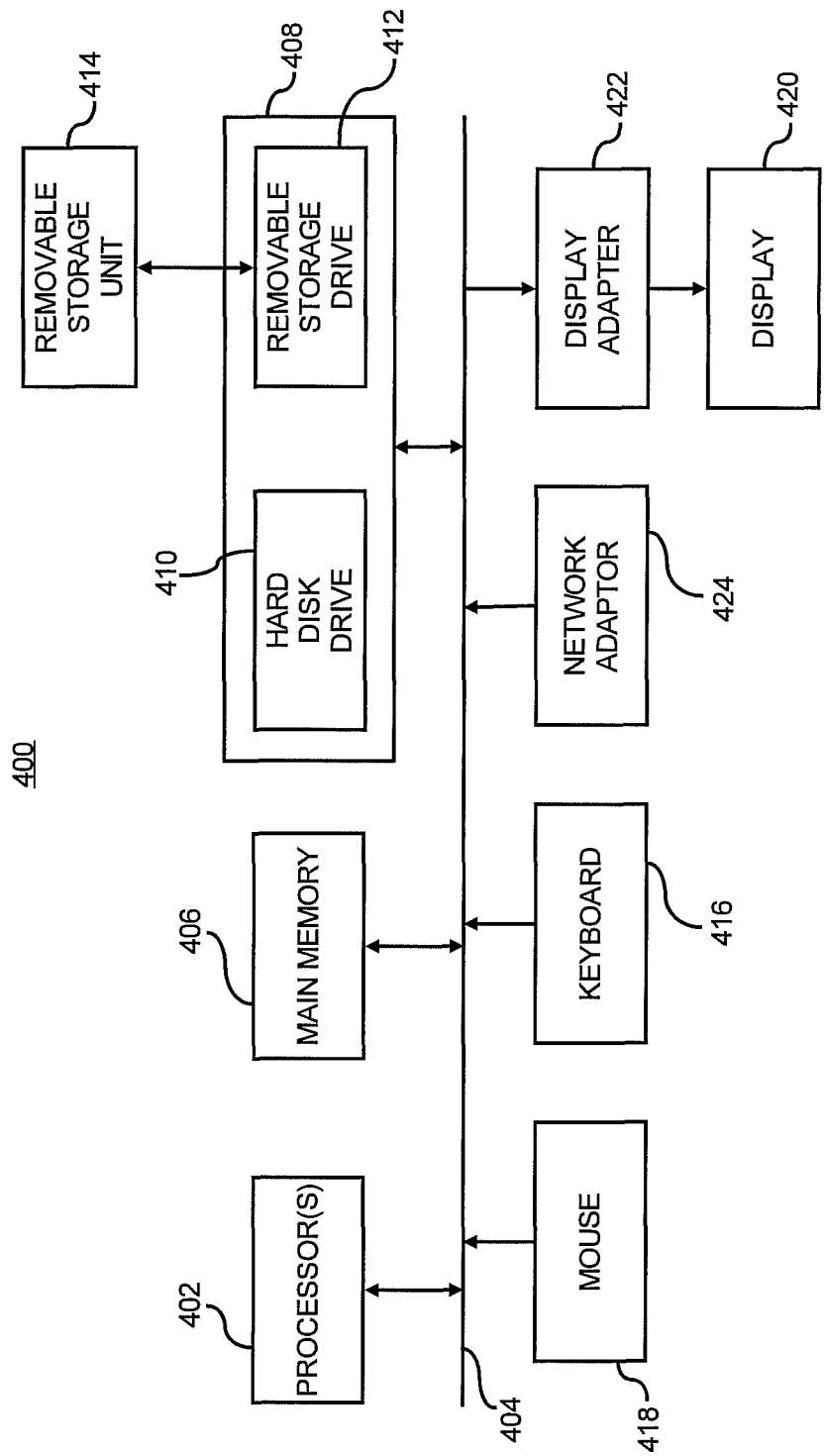
FIG. 4 shows a block diagram of a computing apparatus configured to implement or execute the optimizer depicted in FIGS. 1A and 1B, according to an embodiment of the invention.

FIG. 4 illustrates a block diagram of a computing apparatus 400 configured to implement or execute the optimizer 102 depicted in FIGS. 1A and 1B, according to an example. In this respect, the computing apparatus 400 may be used as a platform for executing one or more of the functions described hereinabove with respect to the optimizer 102.

The computing apparatus 400 includes a processor 402 that may implement or execute some or all of the steps described in the methods 200 and 250. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the methods 200 and 250 may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. It should also be apparent that one or more of the components depicted in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for supplying a resource to an entity from a plurality of resource actuators, said method comprising:
developing, by a processor, a plurality of physics-based models pertaining to the resource actuators and the entity, wherein the entity has a resource demand;
receiving conditions detected at the entity;
performing, by the processor, feedback control to generate an output to modify a resource demand threshold of the entity at a first interval of time based upon a difference between a condition threshold and the detected conditions;
performing, by the processor, feed forward control to generate an output to minimize the resource demand threshold of the entity at a second interval of time that is longer than the first interval of time based upon the detected conditions and the plurality of physics-based models;
formulating, by the processor, a constraint optimization problem having an objective function and at least one constraint using the plurality of physics-based models, wherein the objective function computes at least a proportional quantity of a total power consumption level of the plurality of resource actuators and the at least one constraint comprises a minimum resource demand of the entity;
solving the constraint optimization problem based on the feedback control output and the feed forward control output, wherein the solution provides resource actuator setting values to minimize a power consumed by the plurality of resource actuators; and
setting, by the processor, the plurality of resource actuators to the resource actuator setting values.

2. The method according to claim 1, wherein developing the plurality of physics-based models further comprises:
developing a power model for the plurality of resource actuators that relates settings of the plurality of resource actuators to the power consumed by the plurality of resource actuators;
developing an actuator performance model of the plurality of resource actuators that relates settings of the plurality of resource actuators to resource capacities that the plurality of resource actuators are to supply; and
developing an entity performance model of the entity that relates an environmental condition in the entity to resource provisioning by the plurality of resource actuators.

3. The method according to claim 2,
wherein developing the plurality of physics-based models further comprises developing the plurality of physics-based models to pertain to the plurality of resource actuators and a plurality of entities, wherein developing the plurality of physics-based models further comprises:
developing a resource capacity sharing model that captures the relation between a set of capacities for the plurality of resource actuators and resources supplied to the plurality of entities.

4. The method according to claim 3, wherein the power model is defined as:
$P_i = p_i(A_i)$, wherein $P_i$ is the power consumed by the ith resource actuator, $A_i$ is the setting of the ith resource actuator, and $p_i$ is an algebraic function relating $P_i$ to $A_i$, and wherein a total power consumption (P) of a plurality of resource actuators is defined as:

$$P = \Sigma P_i.$$

5. The method according to claim 4, further comprising:
obtaining experimental data pertaining to a correlation of the settings of the plurality of resource actuators to power consumption levels of the plurality of resource actuators and fitting the power model to the experimental data to calculate the function $p_i$.

6. The method according to claim 3, wherein the performance model of the resource actuator is defined as:
$C_i = c_i(A_i)$, wherein $C_i$ is the resource capacity of the ith resource actuator, $A_i$ is the setting of the ith resource actuator, and $c_i$ is an algebraic function relating $C_i$ to $A_i$, and wherein a total resource capacity (C) of a plurality of resource actuators is defined as:

$$C = \Sigma C_i.$$

7. The method according to claim 3, wherein the entity performance model is defined as:
$T_j = t_j(C_j, P_j, T_{amb,j}, t)$, wherein $T_j$ is the temperature of the jth entity, $C_j$ is a resource supply to the jth component, $P_j$ is a power consumed by the jth entity, $T_{amb,j}$ is the ambient temperature around the jth entity, t is time, and $t_j$ is an algebraic function relating $T_j$ to $(C_j, P_j, T_{amb,j}, t)$.

8. The method according to claim 7, wherein the resource capacity sharing model is defined as:
$C_j = s_j(C_i, i=1, 2, \ldots, n)$, wherein $C_i$ is the resource capacity of the ith resource actuator, and wherein $s_j$ is an algebraic function relating $C_j$ to $C_i$.

9. A computer-implemented optimizer to determine optimal settings to allow a plurality of resource actuators to vary an environmental condition at an entity, said computer-implemented optimizer comprising:
a processor; and
a memory device on which is stored instructions to cause the processor to:
receive data from a plurality of input sources;
develop a plurality of physics-based models pertaining to the plurality of resource actuators and the entity, wherein the entity has a resource demand;
perform feedback control to generate an output to modify a resource demand threshold of the entity at a first interval of time based upon a condition threshold and the received data;
perform feed forward control to generate an output to minimize the resource demand threshold of the entity at a second interval of time that is longer than the first interval of time based upon the received data and the plurality of physics-based models;
formulate a constraint optimization problem having an objective function and at least one constraint using the plurality of physics-based models, wherein the objective function computes at least a proportional quantity of a total power consumption level of the plurality of resource actuators and the at least one constraint comprises a minimum resource demand of the entity;

solve the constraint optimization problem based on the feedback control output and the feed forward control output, wherein the solution provides resource actuator setting values for the plurality of resource actuators to minimize power consumed by the plurality of resource actuators; and set the plurality of resource actuators to the resource actuator setting values to supply the entity with the resource from the resource actuator.

10. The computer-implemented optimizer according to claim 9, wherein the instructions are further to cause the processor to:

develop a power model for the plurality of resource actuators to relate settings of the plurality of resource actuators to power consumed by the plurality of resource actuators;

develop an actuator performance model of the plurality of resource actuators, the actuator performance model to relate settings of the plurality of resource actuators to resource capacities that the plurality of resource actuators are to supply; and develop an entity performance model of the entity that relates an environmental condition in the entity to resource provisioning by the plurality of resource actuators.

11. The computer-implemented optimizer according to claim 10, wherein the instructions are further to cause the processor to:

develop the plurality of physics-based models pertaining to the plurality of resource actuators and a plurality of entities, wherein the plurality of physics-based models are further to develop a resource capacity sharing model that captures the relation between a set of capacities for the plurality of resource actuators and resources supplied to the plurality of entities.

12. The computer-implemented optimizer according to claim 11, wherein the power model is defined as:

$P_i = p_i(A_i)$, wherein $P_i$ is the power consumed by the ith resource actuator, $A_i$ is the setting of the ith resource actuator, and $p_i$ is an algebraic function relating $P_i$ to $A_i$, and wherein a total power consumption (P) of the plurality of resource actuators is defined as:

$$P = \Sigma P_i.$$

13. The computer-implemented optimizer according to claim 12, wherein the instructions are further to cause the processor to:

obtain experimental data pertaining to a correlation of the settings of the plurality of resource actuators to power consumption levels of the plurality of resource actuators; and fit the power model to the experimental data to calculate the function $p_i$.

14. The computer-implemented optimizer according to claim 12, wherein the performance model of the resource actuator is defined as:

$C_i = c_i(A_i)$, wherein $C_i$ is the resource capacity of the ith resource actuator, $A_i$ is the setting of the ith resource actuator, and $c_i$ is an algebraic function relating $C_i$ to $A_i$, and wherein a total resource capacity (C) of the plurality of resource actuators is defined as:

$$C = \Sigma C_i.$$

15. The computer-implemented optimizer according to claim 12, wherein the entity performance model is defined as:

$T_j = t_j(C_j, P_j, T_{amb,j}, t)$, wherein $T_j$ is the temperature of the jth entity, $C_j$ is a resource supply to the jth component, $P_j$ is a power consumed by the jth entity, $T_{amb,j}$ is the ambient temperature around the jth entity, t is time, and $t_j$ is an algebraic function relating $T_j$ to $(C_j, P_j, T_{amb,j}, t)$.

16. The computer-implemented optimizer according to claim 15, wherein the resource capacity sharing model is defined as:

$C_j = s_j(C_i, i=1, 2, \ldots, n)$, wherein $C_i$ is the resource capacity of the ith resource actuator, and wherein $s_j$ is an algebraic function relating $C_j$ to $C_i$.

17. A non-transitory computer readable storage medium on which is embedded one or more machine readable instructions, wherein said one or more machine readable instructions, when executed by a processor, implement a method of supplying a resource to an entity from a plurality of resource actuators, wherein the entity has a resource demand, and wherein the one or more instructions are to cause the processor to:

receive a condition detected at the entity;

perform feedback control to generate an output to modify a resource demand threshold of the entity at a first interval of time based upon the detected condition;

perform feed forward control to generate an output to minimize the resource demand threshold of the entity at a second interval of time that is longer than the first interval of time based upon the detected condition and the plurality of physics-based models;

formulate a constraint optimization problem having an objective function and at least one constraint using the plurality of physics-based models, wherein the objective function computes at least a proportional quantity of a total power consumption level of the plurality of resource actuators and the at least one constraint comprises a minimum resource demand of the entity;

solve the constraint optimization problem based on the feedback control output and the feed forward control output, wherein the solution provides resource actuator setting values for the plurality of resource actuators to minimize a power consumption of the plurality of resource actuators; and set the plurality of resource actuators to the resource actuator setting values to supply the entity with the resource from the resource actuator.

18. The non-transitory computer readable storage medium according to claim 17, said one or more computer programs further comprising instructions to cause the processor to:

generate a power model for the plurality of resource actuators that relates settings of the plurality of resource actuators to power consumed by the plurality of resource actuators;

generate an actuator performance model of the plurality of resource actuators that relates settings of the plurality of resource actuators to resource capacities that the plurality of resource actuators are configured to supply; and generate an entity performance model of the entity that relates an environmental condition in the entity to resource provisioning by the plurality of resource actuators.

19. The non-transitory computer readable storage medium according to claim 17, said one or more computer programs further comprising instructions to cause the processor to:

generate the plurality of physics-based models pertaining to the plurality of resource actuators and a plurality of entities, wherein to generate the plurality of physics-based models, the instructions are further to cause the processor to:

generate a resource capacity sharing model that captures the relation between a set of capacities for the plurality of resource actuators and resources supplied to the plurality of entities.

* * * * *